United States Patent [19]

Kihara et al.

[11] Patent Number: 4,475,153
[45] Date of Patent: Oct. 2, 1984

[54] METHOD AND APPARATUS FOR AUTOMATIC CONTROL OF ELECTRONIC EQUIPMENT

[75] Inventors: Nobutoshi Kihara, Tokyo; Tadahiko Nakamura, Ayase, both of Japan

[73] Assignee: Sony Corporation, Tokyo, Japan

[21] Appl. No.: 312,870

[22] Filed: Oct. 19, 1981

[30] Foreign Application Priority Data

May 29, 1980 [JP] Japan .................................. 55-71803

[51] Int. Cl.³ .......................... H04N 5/76; G06K 7/10
[52] U.S. Cl. .................................... 364/145; 364/143; 364/146; 364/188; 364/191; 364/569; 364/400; 235/463; 340/309.15; 358/335; 360/69; 369/19
[58] Field of Search ............... 364/143, 144, 145, 146, 364/400, 569; 358/335, 337; 235/462, 463, 494; 340/309.1, 309.4; 369/19; 360/69

[56] References Cited

U.S. PATENT DOCUMENTS

| | | | |
|---|---|---|---|
| 3,701,886 | 10/1972 | Jones .................................... | 235/462 |
| 4,114,033 | 9/1978 | Okamoto et al. ..................... | 235/494 |
| 4,222,069 | 9/1980 | Groetschel .......................... | 358/337 |
| 4,325,081 | 4/1982 | Abe et al. ........................ | 364/144 X |

FOREIGN PATENT DOCUMENTS 2034995 6/1980 United Kingdom .
2044446 10/1980 United Kingdom .

OTHER PUBLICATIONS

Legatt, "Broadcasting", Wireless World, Jan. 1980, pp. 41–44.

Primary Examiner—Joseph F. Ruggiero
Assistant Examiner—Allen MacDonald
Attorney, Agent, or Firm—Lewis H. Eslinger; Alvin Sinderbrand

[57] ABSTRACT

An electronic device, such as a video tape recorder (VTR), is set into a desired, but complex mode, such as automatic recording of a desired program, by manual scanning with an optical wand or other scanning instrument of one or more code groups printed on a selection card. Respective selection cards have code groups thereon for selecting, for example, mode, channel, day of week, recording start time (including AM or PM), and recording end time. Code signals provided from the scanning instrument are processed in a data processing circuit, which can be provided as a microprocessor and included in the VTR to provide control signals to the VTR in response to information contained in the scanned code groups. Alternatively, a combination of an FM receiver and high fidelity audio recorder can be set into an auto record mode or other complex operating mode by scanning of selection cards with a scanning instrument associated with such combination.

2 Claims, 15 Drawing Figures

FIG.I
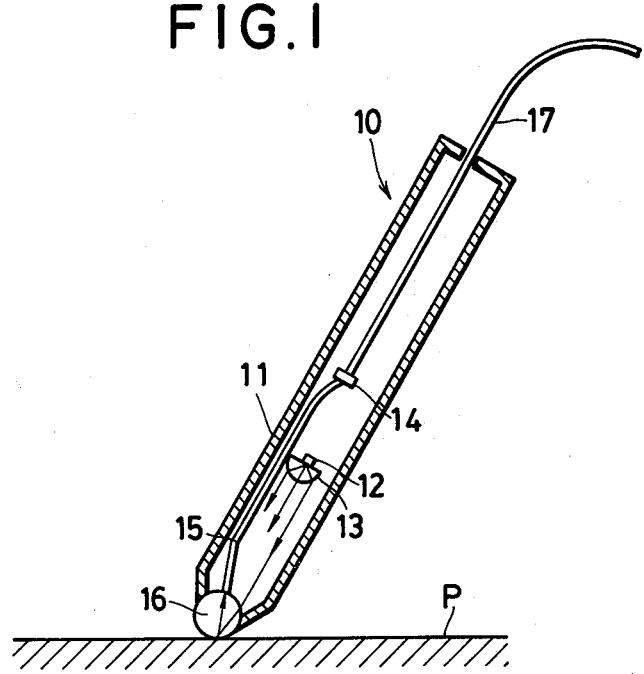
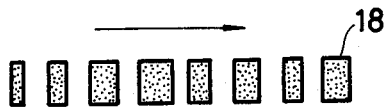
FIG.2A
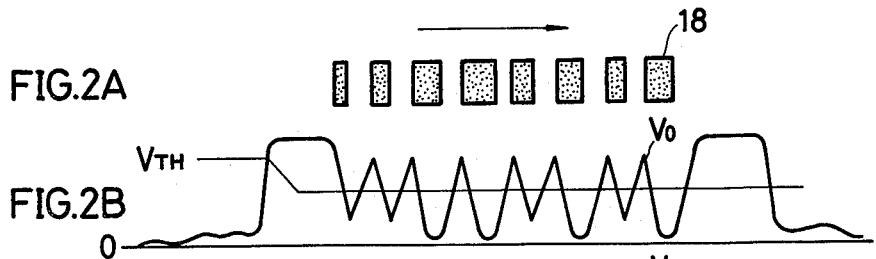
FIG.2B
FIG.2C

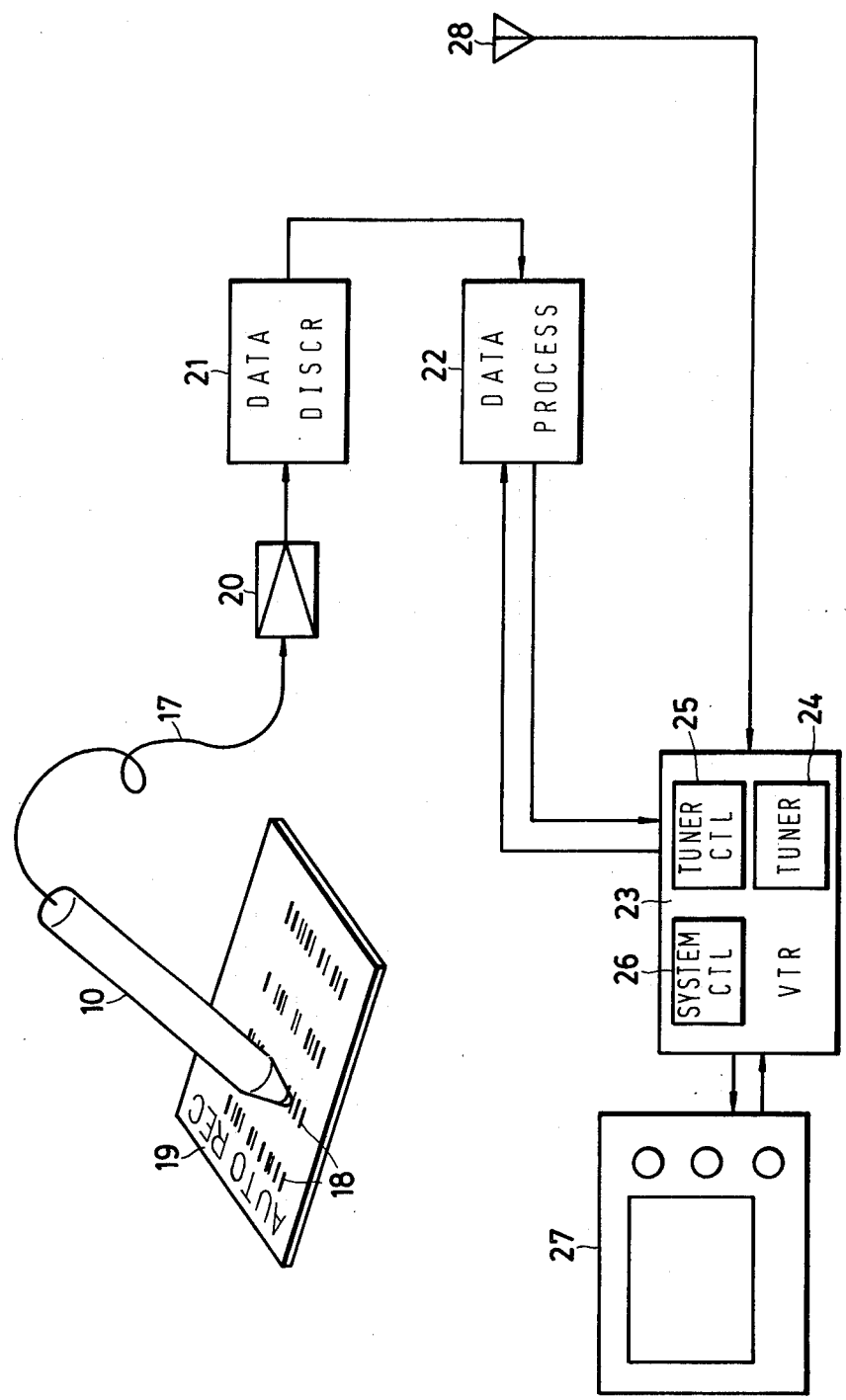

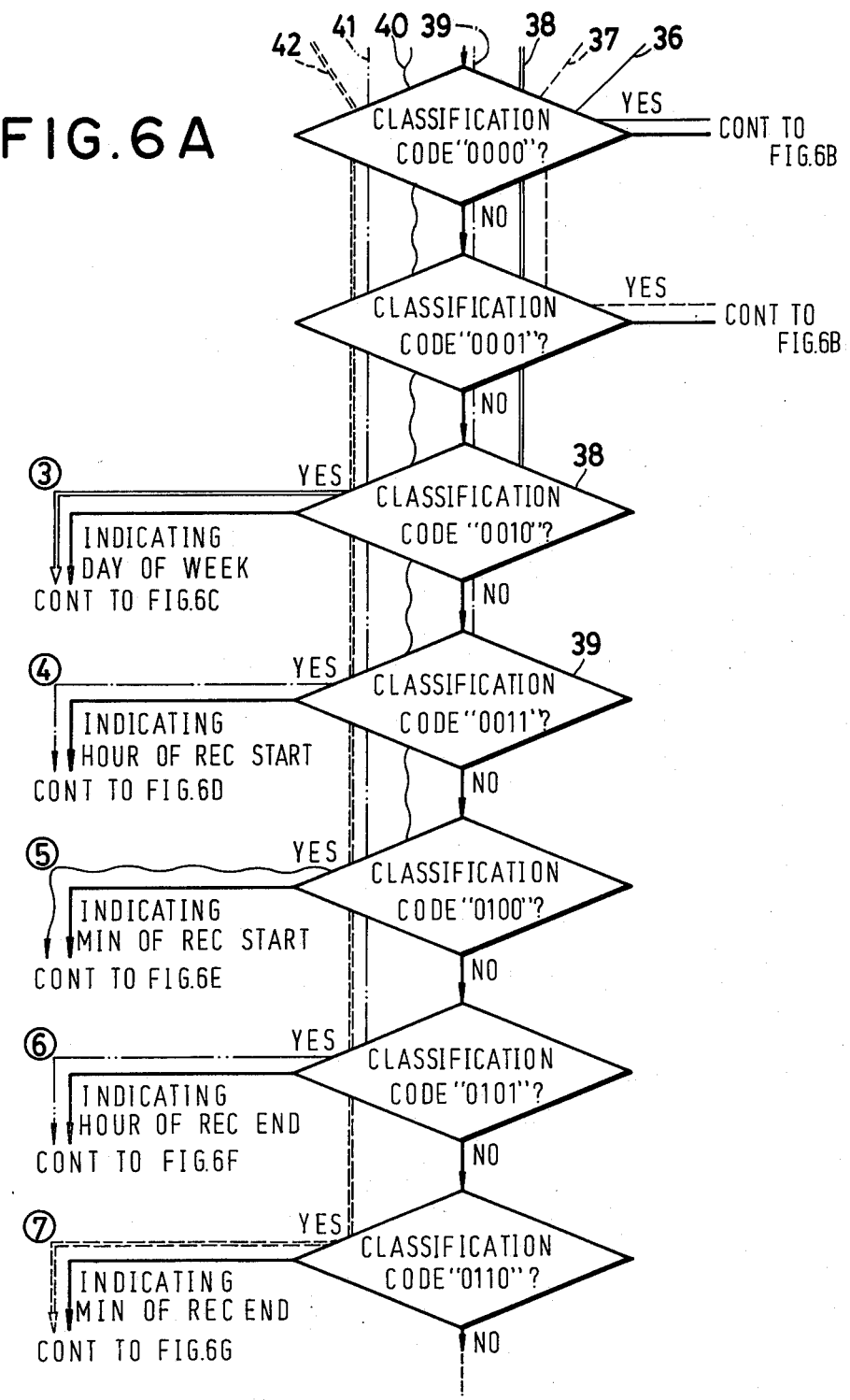

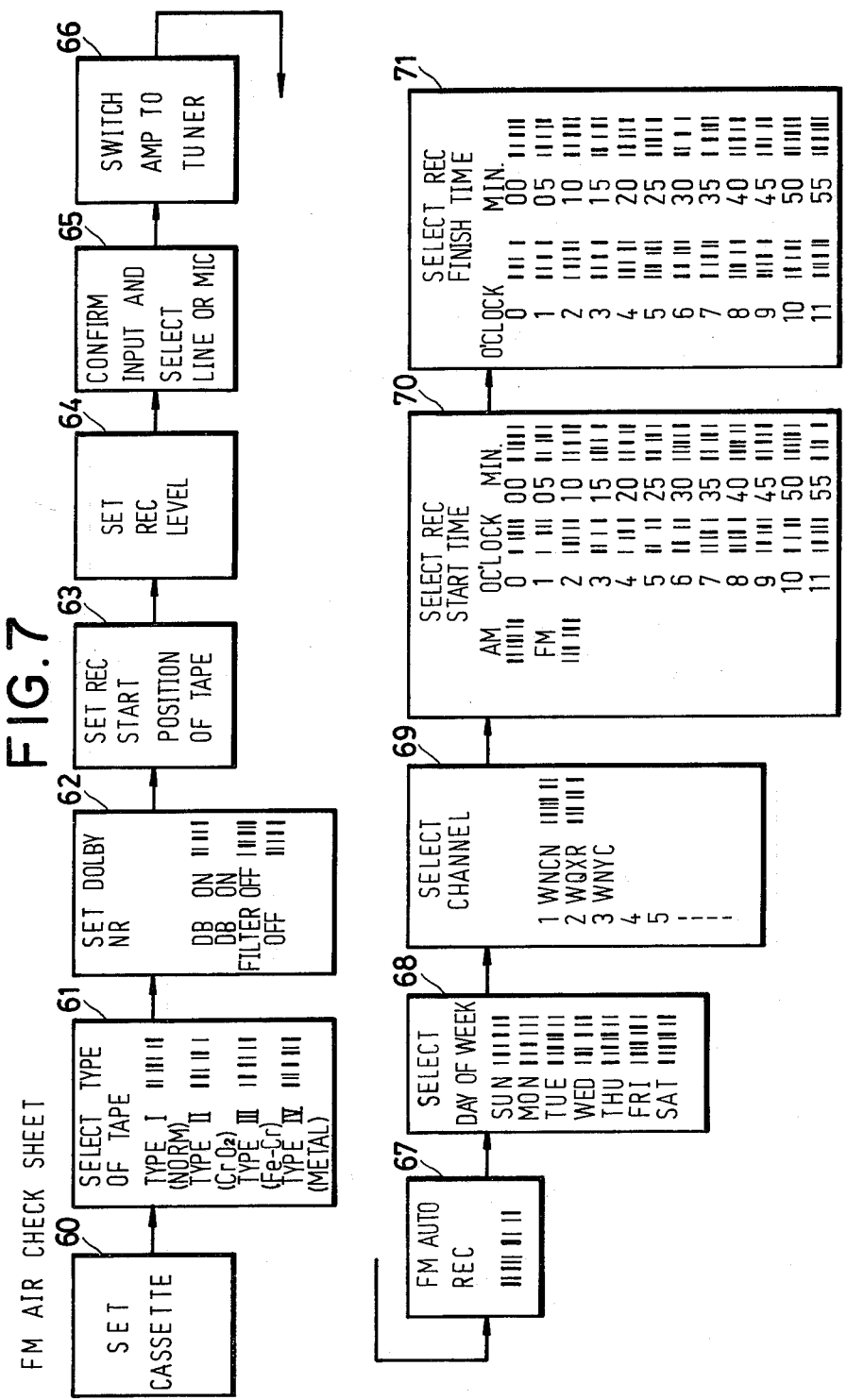

METHOD AND APPARATUS FOR AUTOMATIC CONTROL OF ELECTRONIC EQUIPMENT

BACKGROUND OF THE INVENTION

1. Field of the Invention

This invention relates to automatic control of electronic equipment, and is particularly directed to the automatic control of a high-fidelity audio recorder or a video recorder so that a desired program on a selected channel, beginning and ending at preset times, is automatically recorded.

2. Description of the Prior Art

Recent video tape recorders (VTRs) designed for home used have been constructed to be of high quality and to include numerous functions. Such functions can include, for example, the recording of one program at the same time that a second program is being viewed, automatic recording at preset times, and special reproduction or playback functions, such as triple-speed reproduction, frame stepping, still reproduction, slow-motion reproduction, and the like. These special functions are included in addition to the usual functions of recording a broadcast television program off the air and recording directly from a video camera.

As the number of functions associated with the home-use VTR has been increasing, the difficulty for the user in handling and operating the VTR has also been increasing. Consequently, the ordinary consumer frequently finds the operation of the VTR to be overly complex. For example, if an automatic recording operation is to be performed, various settings, such as presetting the start and end times on a timer, selecting the desired day of the week, and selecting the appropriate channel involves the actuation of a large number of switches and knobs. These switches and knobs must be actuated in a predetermined order, otherwise the desired television program is likely not to be recorded, or to be recorded incompletely.

Many consumers have experienced a great deal of difficulty in mastering the complicated operation and handling of the VTR, and, as a result, consumers often meet with partial or complete misoperation of the VTR.

Consequently, there has been a need to provide a straightforward and reliable system for controlling the operation of the recent, rather complex VTRs, which system will enable consumers to take full advantage of the rather complex VTR while keeping confusion concerning the operation thereof to a minimum.

OBJECTS AND SUMMARY OF THE INVENTION

Accordingly, it is an object of this invention to provide an improved method and apparatus for controlling an electronic device, such as a video tape recorder, which can control the rather complex operation thereof while avoiding confusing operational steps characteristic of the prior art.

It is another object of this invention to provide an improved method and apparatus for controlling an electronic device in which the mode thereof can be accurately set and erroneous operation avoided despite the complexity of the operating mode.

In accordance with an aspect of this invention, a method of controlling an electronic device having a plurality of operating modes utilizes a selection card bearing thereon a plurality of code groups, each such code group corresponding to a particular one of the operating modes, and also utilizes a code scanning instrument capable of picking up the code groups. The method includes manually scanning a selected one or more of the code groups with the code scanning instrument to produce a corresponding data code word or words, and automatically selecting the mode corresponding to such code group or groups in response to the associated data code word or words.

In several preferred embodiments, the method of this invention can be used to control a receiver capable of being tuned to any of a plurality of channels by use of a channel selection card bearing a plurality of such code groups, with each code group corresponding to a particular channel. In such a method, the channel corresponding to the selected code group is automatically set in response to an electrical code word provided from the code scanning instrument.

In such preferred embodiments, a start time and an end time can also be selected by manually scanning at least one selected code group on each of a start-time select card and an end-time select card, respectively.

According to another aspect of this invention, apparatus for controlling a receiver and recorder in combination comprises a mode selection card bearing function code groups corresponding respectively to modes of the recorder, a channel selection card bearing channel code groups corresponding to respective broadcast channels to which the receiver can be tuned, a start-time select card bearing code groups corresponding to respective start times, an end-time select card bearing code groups corresponding to respective end times, a scanning instrument for manually scanning the code groups of the respective selection cards, and automatic code processing circuitry for receiving the electrical representations provided from the scanning instrument and in response thereto providing selecting signals to the receiver and recorder in combination to select the desired mode of the recorder, to tune the receiver, and to preset the times for the recorder and receiver to be turned on and off.

The receiver and recorder in combination can constitute a video tape recorder (VTR) or, alternatively, can be an FM receiver and an audio tape recorder.

The above and other objects, features and advantages of this invention will become apparent from the ensuing description of illustrative embodiments thereof, which is to be read in conjunction with the accompanying drawings.

BRIEF DESCRIPTION OF THE DRAWINGS

FIG. 1 is a sectional elevational view of a code scanning instrument as used in accordance with this invention.

FIGS. 2A-2C respectively illustrate a pattern of a monochromatic code group and corresponding output waveforms of the scanning instrument.

FIG. 3 is a schematic circuit diagram showing one embodiment of the present invention.

FIGS. 6A-6G constitute a flow chart for a control signal processing routine according to this invention.

FIG. 7 illustrates an arrangement of descriptive cards and selection cards in accordance with another embodiment of this invention.

DETAILED DESCRIPTION OF PREFERRED EMBODIMENTS

Figure 4:
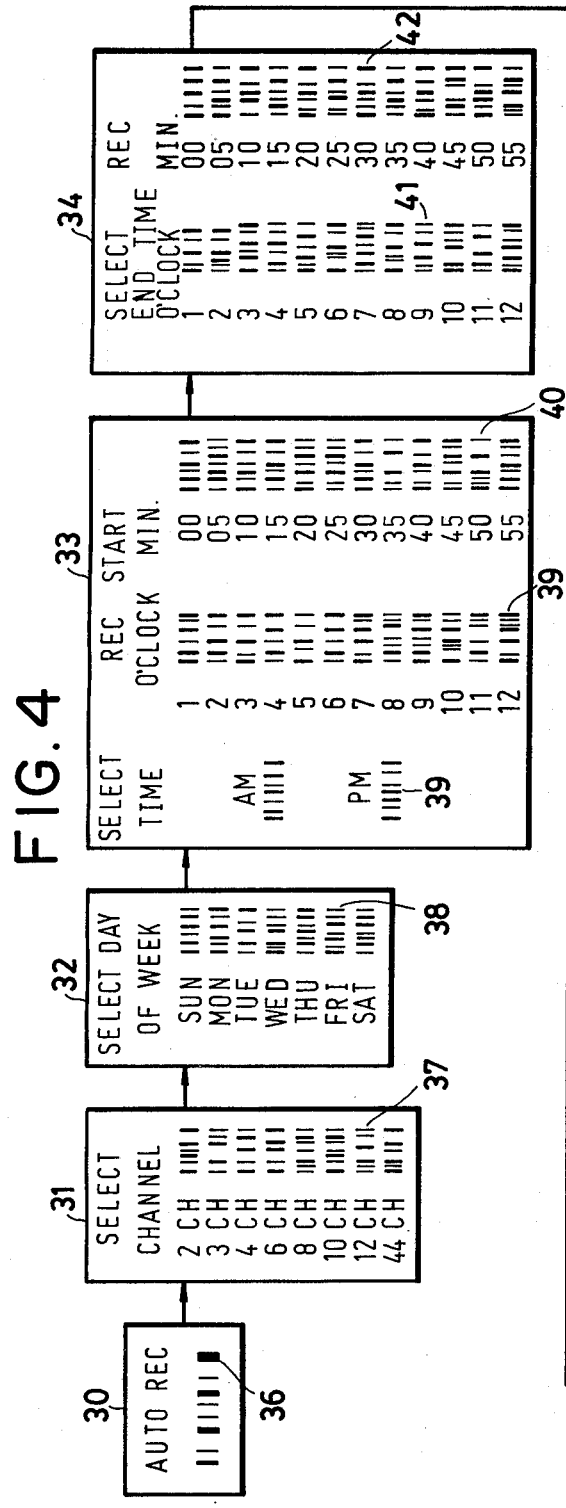
FIG. 4 shows an arrangement of selection cards and a descriptive card for use with the embodiment of FIG. 3.

With reference to the drawings, and initially to FIGS. 1 and 2 thereof, the embodiments of the present invention comprise a plurality of control cards having control groups printed thereon, with each such code group being formed at a monochromatic pattern of bars forming alternate light and dark areas, i.e., marks and spaces. In order to read the printed code groups and provide an electrical representation thereof to a code interpretation circuit, there is provided as a code scanning instrument a mark reader or wand 10 arranged for optically reading the monochromatic pattern.

The mark reader 10 has a barrel or case 11 approximately the size and shape of a ballpoint pen. Disposed therewithin is an LED 12 which emits light through a collimating lens 13 which directs the emitted light forwardly, i.e., to the front of the barrel 11. A phototransistor 14 is also disposed within the barrel 11 and has an optical fiber 15 connecting a light sensitive surface thereof to the front of the mark reader 10. A spherical ruby lens 16 is provided at the front of the mark reader 10, and is contacted with the optical fiber 15. A bundle of lead wires 17 extend out of the back of the barrel 11. These wires provide direct current to power the LED 12, and also carry the output signal from the phototransistor 14.

When the spherical ruby lens 16 is in contact with a surface of a paper P, light emitted from the LED 12 passes through the lens 16 and is reflected by the paper P as shown by the bent arrow. Then the light so reflected is carried by the optical fiber 15 to the phototransistor 14, and the latter provides an output signal corresponding to the amount of reflected light received thereby.

Thus, for example, if the mark reader 10 is contacted with a monochromatic coded data pattern 18, as shown in FIG. 2A, and is moved in the direction indicated by the arrow therein, the phototransistor 14 will provide an output signal $V_O$ as shown in FIG. 2B. This signal $V_O$ is compared with a threshold level $V_{TH}$ and a resulting square wave signal $V_C$ is provided, as shown in FIG. 2C. The square wave signal $V_C$ is high whenever the output signal $V_O$ is above the threshold level $V_{TH}$ and is low whenever the output signal $V_O$ is lower than the threshold level $V_{TH}$. The high portions and low portions of the signal $V_C$ correspond substantially to the marks and spaces of the code group 18. Thus, the signal $V_C$ can be applied to a data processing circuit where the same can be discriminated based on the content of data encoded within the code group 18.

In a preferred embodiment of this invention, as illustrated in FIG. 3, these control groups 18 are printed as monochromatic code patterns on one or more control cards 19, and the mark reader 10 scans a selected one of the code groups 18 to provide the signal $V_C$ as a control signal to control one or more operational modes of a VTR.

In this embodiment, the signal $V_C$ is applied to a sensor amplifier 20 and thence to a data discrimination circuit 21 which judges the content of the control code 18 being picked up by the mark detector 10. The judged content of the code group is applied from the data discrimination circuit 21 to a data processing circuit 22. In response to the judged content, the data processing circuit 22 provides control signals to a video tape recorder or VTR 23 to control the operational mode and thereof tuning, and to preset the turn-on and turn-off times thereof. The data processing circuit 22 also receives status information from the VTR 23. The data discrimination circuit 21 and data processing circuit 22 can easily be formed as an integrated circuit, such as a microprocessor, and can thus be incorporated within the VTR 23.

The VTR 23 contains within it a tuner circuit 24, a tuner control circuit 25, and a system control circuit 26. A television receiver or monitor 27 is coupled to the VTR 23, and an antenna 28 is coupled to the tuner 24 thereof.

As a practical matter, the television receiver 27 is not strictly necessary for carrying out operations not involving display of a video picture, as the VTR is itself a combination recorder and tuner. Here, television receiver 27 is necessary only to monitor the contents of a video program.

FIG. 4 illustrates one example of control cards for use in the control of the VTR 23, for example, in recording a desired program off the air when the user is away from home (i.e., an auto-record mode). In this embodiment, five selection cards 30-34 and an instruction card 35 are used. Each of the selection cards 30-34 has control code groups formed as monochromatic patterns printed thereon, and also has a descriptive legend thereon to indicate the particular control function of the code groups printed thereon.

The selection card 30 has a control code group 36 thereon to initiate the auto-record mode setting operation. The selection card 31 is a channel selection card and has control code groups 37 thereon corresponding to respective to local channels which can be received. The selection card 32 is a day-of-week selection card and includes seven code groups 38 corresponding respectively to the days Sunday through Saturday. The selection card 33 is a start-time selection card and has twelve hour-interval code groups 39, an AM code group, and a PM code group, and twelve sub-hour interval code groups 40 (each representing a five minute interval). The selection card 34 is an end-time selection card and has twelve hour-interval code groups 41 and twelve five-minute-interval code groups 42 printed thereon.

The instruction card 35 lists for the user the simple steps to be followed to preset the VTR for automatic recording.

Figure 5:
FIG. 5 shows the code arrangement of a code group pattern according to this invention.

As illustrated in FIG. 5, each of the code groups 36-42 represents an eight-bit code, the first four bits of which constitute a classification code, and the last four bits of which constitute a data code. For example, the code group 36 on the card 30 consists of a classification code for specifying a system control operation, and a data code for specifying that the system control operation is the selection of an automatic recording mode. Similarly, the channel select code groups 37 on the card 31 consists of a classification code for specifying a channel selection, and a data code for specifying a channel number. The code groups 38 on the day-of-week select cards 32 consist of a classification code for specifying a day-of-week selection and a data code for specifying a particular day of week.

The code groups 39 on the start-time select card 33 each consist of a classification code for selection of a record starting time (including the selection of either morning or afternoon) and a data code for specifying a particular hour (as well as for specifying morning or afternoon). The code groups 40 consist of a classification code for specifying a selection of a particular minute at which automatic recording is to start, and a data code for specifying the minute of the start time.

On the end-time select card 34, the code groups 41 each consist of a classification code for specifying a selection of the hour at which recording is to be ended, and a data code for specifying the particular hour. Similarly, the code groups 42 each consist of a classification code for selecting the minute of a recording end time, and a data code for specifying the particular minute.

It is possible that the end-time select card 34 could also include code groups for selecting AM and PM. However, in the preferred embodiment, the end time is assumed to occur less than twelve hours after the start time, and the data processing circuit 22 will automatically select the day of week, as well as AM or PM, as appropriate, considering the selected start time The particular formulation of the code groups 36–42 can be described generally as follows:

The classifaction code of the code groups 36 can be an arbitrary group of four bits, such as "0000", to indicate that a particular function of the VTR 23 is to be selected. In the usual home-use VTR, in addition to an automatic recording mode, there are also modes provided for viewing a television program off the air, playback of a recorded cassette, recording of a television program, setting of a timer, and recording directly from a video camera. To that end, the following data codes can be provided to establish these operating modes of the VTR 23:

| DATA-CODE | OPERATING MODE |
|---|---|
| 0000 | Display of a broadcast TV program |
| 0001 | Playback of a recorded cassette |
| 0010 | Recording of a broadcast program |
| 0011 | Automatic recording |
| 0100 | Setting of timer |
| 0101 | Recording from camera |

Thus, when the code group 36 for specifying an automatic recording operation is scanned by the mark reader 10, the signal $V_C$ provides an initial four bits of "0000" and a subsequent four bits of "0011". Thus, the data processing circuit 22 receives the following code pattern,

| Classification code |
|---|
| $\overline{0000}$ $\underset{\sim}{0011}$ |
| Data code | and the data processing circuit 22 is conditioned for carrying out automatic recording.

Similarly, the classification code and the data code of the code patterns 37–42 can be expressed as follows:

| CLASSIFICATION FUNCTION CODE | DATA CODE | FUNCTION |
|---|---|---|
| 0 0 0 0 1 Selection of channel (code pattern (36)) | 0 0 0 0 | none |
|  | 0 0 0 1 | Channel 2 |
|  | 0 0 1 0 | Channel 3 |
|  | 0 0 1 1 | Channel 4 |
|  | — | — |
| 0 0 1 0 Selection of day of week (code pattern (38)) | 0 0 0 0 | Sunday |
|  | 0 0 0 1 | Monday |
|  | 0 0 1 0 | Tuesday |
|  | — | — |
| 0 0 1 1 Selection of record starting time (including both morning and afternoon) (code pattern (39)) | 0 0 0 0 | Morning (AM) |
|  | 0 0 0 1 | Afternoon (PM) |
|  | 0 0 1 0 | one o'clock |
|  | 0 0 1 1 | two o'clock |
|  | — | — |
| 0 1 0 0 Selection of minutes of record starting (code pattern (40)) | 0 0 0 0 | 0 min. |
|  | 0 0 0 1 | 5 min. |
|  | 0 0 1 0 | 10 min. |
|  | 0 0 1 1 | 15 min. |
|  | — | — |
| 0 1 0 1 Selection of record ending time (code pattern (41)) | 0 0 0 0 | Morning (optional) |
|  | 0 0 0 1 | Afternoon (optional) |
|  | 0 0 1 0 | one o'clock |
|  | 0 0 1 1 | two o'clock |
|  | — | — |
| 0 1 1 0 Selection of minutes of record ending (code pattern (42)) | 0 0 0 0 | 0 min. |
|  | 0 0 0 1 | 5 min. |
|  | 0 0 1 0 | 10 min. |
|  | 0 0 1 1 | 15 min. |
|  | — | — |

As indicated above, the data codes for entering the hour and minute of the start time and end time are common to both cards 33 and 34. These time select code groups are, of course, also used in other modes than the automatic recording mode, for instance, where a tape is to be played for a predetermined amount of time, or where an alarm timer is to be set to a particular time.

Generally, once a cassette is loaded into the VTR 23, the same is conditioned for automatically recording a desired program by scanning the mark reader 10 in sequence across appropriate ones of the respective code groups 36, 37, 38, 39, 40, 41, and 42. The data provided in the signal $V_C$ are then interpreted in the data processing circuit 22 generally as illustrated in FIGS. 6A–6G.

Figure 6B:
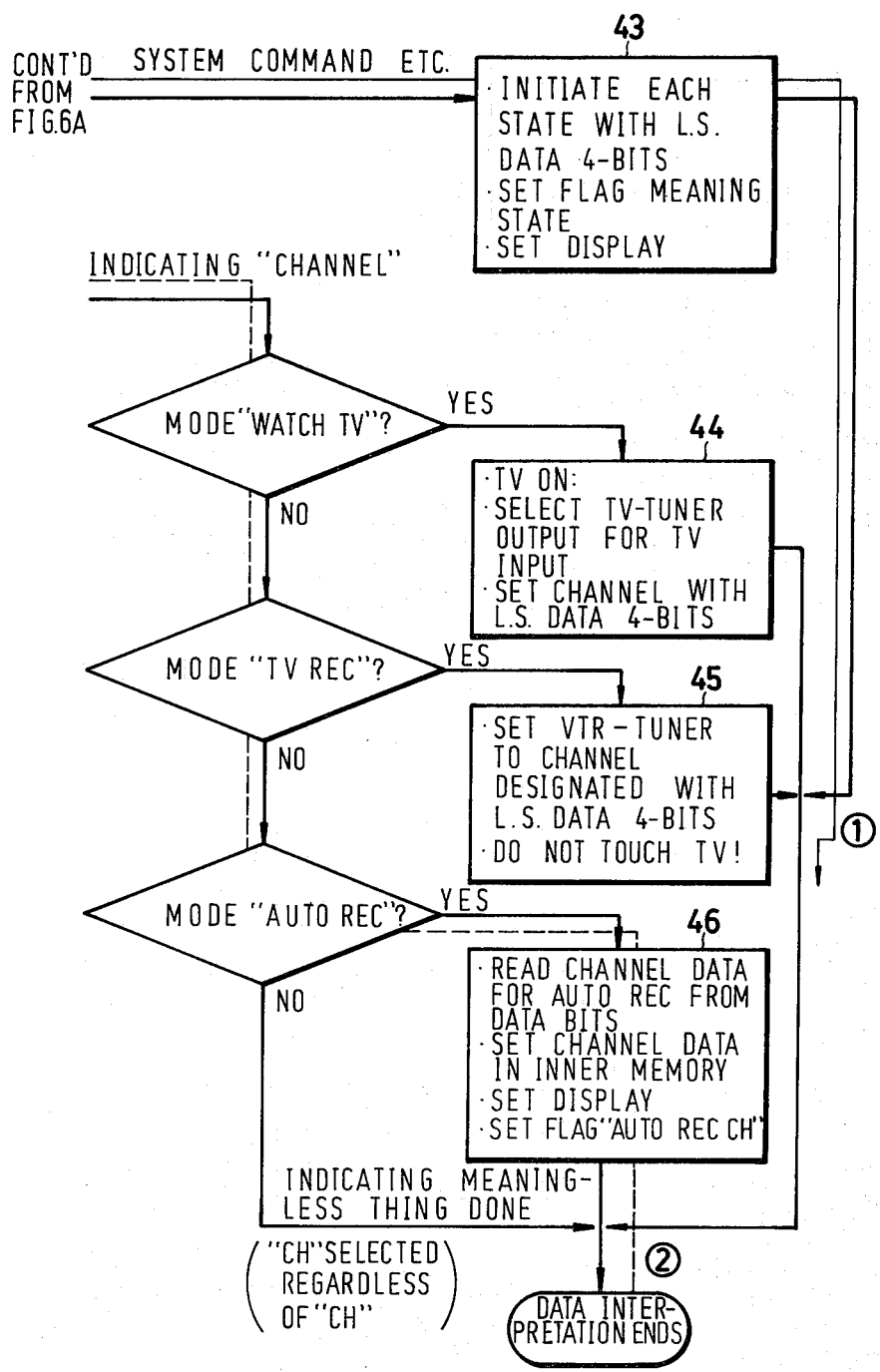

FIGS. 6A to 6G constitute a flow chart illustrating the operation of the data processing circuit 22. In these figures, the processing of data from the code groups 36–42 are respectively indicated by means of a solid line, a single dash line, a double solid line, a dot-and-dash line, a wavy line, a two-dot-and-dash line, and a double dash line, respectively. FIG. 6A indicates the distribution of the data by identifying the classification codes "0000" to "0110". If the classification code is "0000" or "0001", indicating a mode selection or a channel selection, respectively, the processing operation proceeds to the routines illustrated in FIG. 6B. If the classification code is "0010", the data processing routine proceeds to the day-of-week selection routine in FIG. 6C. If the classification code is "0010", the data processing operation proceeds to the hour-of-record-start routine of FIG. 6D. If the classification code is "0100", the data processing operation proceeds to the minute-of-record-start routine of FIG. 6E. If the classification code is "0101", the data processing operation proceeds to the hour-of-record-end routine of FIG. 6F. Finally, if the classification code is "0110", the data processing operation proceeds to the minute-of-record-end routine shown in FIG. 6G.

If the classification code is "0000", the appropriate mode is selected, as indicated by the final four bits or data code thereof, as indicated by the box 43 of FIG. 6B. If the final four bits are "0011", an auto-record flag will be set equal to "1", and an indication of "auto-record" will appear on a display of the VTR 23.

If the classification code is "0001", indicating a channel selection operation, the channel selection routine as indicated on FIG. 6B is followed, according to the steps of boxes 44-46.

If the VTR 23 has been set into a "watch TV" mode, the data processing circuit 22 follows the operation listed in the box 44. The television receiver 27 is turned on, and the tuner 24 is tuned to the desired channel, which is set by the final digits of the channel selecting code group 37.

If the VTR 23 is in a "TV record" mode, the data processing circuit 22 follows the steps listed in the box 45. The tuner of the VTR 23 is set to the channel designated by the final four digits of the code group 37, and a broadcast signal is recorded. This operation does not affect the status of the television receiver 27.

If the VTR 23 is in an "auto-record" mode, the operation listed in the box 46 is followed. The channel determined from the final four digits of the code group 37 is stored in a memory, an indication of "auto record" is displayed, and a flag "auto record channel" is set to "1".

If none of the foregoing modes have been selected (indicating that the channel selection is inappropriate), the channel of the VTR tuner 24 is nonetheless changed as indicated by the last four digits of the channel selecting code group.

Figure 6C:
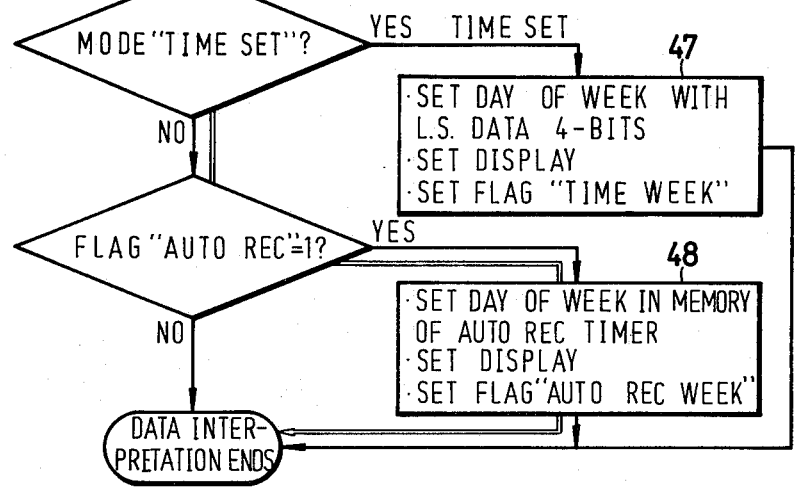

In the day-of-week select routine of FIG. 6C, if the VTR 23 is in a "time set" mode, the data processing circuit 22 proceeds to perform a time set operation as illustrated in box 47. Here the day of the week is set using the final four digits of the code group 38, a "time set" indication is displayed, and a "time week" flag is set to "1".

If an auto record operation has been selected, and the "auto rec" flag is "1". the data processing circuit 22 proceeds to perform the steps in box 48. Here, the day-of-week is set in a timer memory thereof, the selected day of week is displayed, and an "auto record week" flag is set to "1".

Figure 6D:
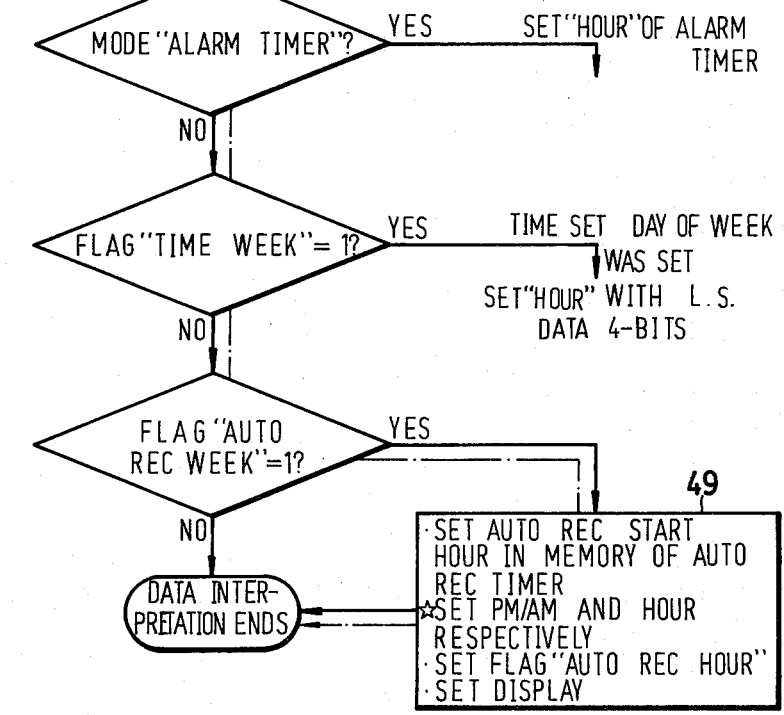

The setting of hours is illustrated in FIG. 6D.

If the VTR 23 is in an "alarm timer" mode, the hour is set in the timer memory using the last four digits of the time code group 39.

If the "time week" flag is "1", the hour indicated by the final four bits of the code group 39 is stored with the day of week in the timer memory.

If the "auto record week" flag is "1", the data processing circuit 22 follows the steps listed in box 49. The auto-record start-time hour, as indicated by the final four bits of the code group 39, together with the bits of the respective "AM" or "PM" indication, are stored in the timer memory, the record-start hour is displayed, and a flag "auto record hour" is set to "1".

Figure 6E:
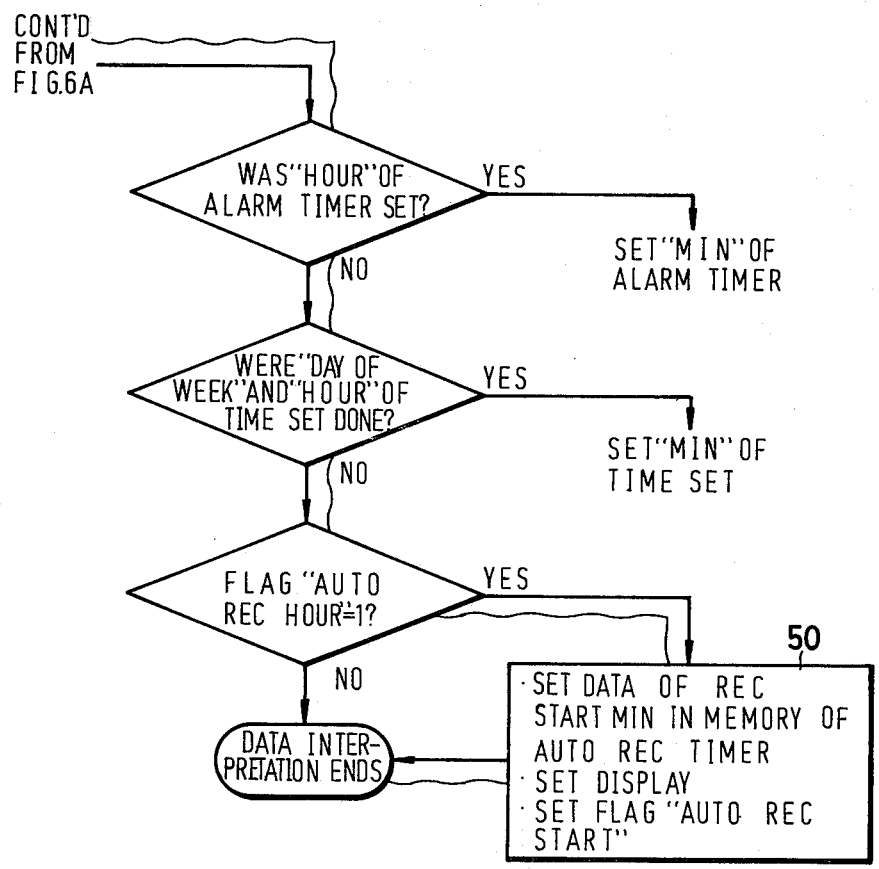

The start minute setting operation is illustrated in FIG. 6E.

If the hours of the alarm timer have been set, the final four digits of the code group 40 are used to set the minutes of the alarm timer.

If the day of week setting and hour setting of a time set operation have been performed, the final four digits of the code group 40 are used to set the minutes for the time set operation.

However, if the flag "auto record hour" is "1", the data processing circuit 22 follows the operational steps listed in box 50. The minutes data as indicated by the final four digits of code group 40 are stored in the auto record timer memory, the minutes are displayed, and a flag "auto record start" is set to "1".

Figure 6F:
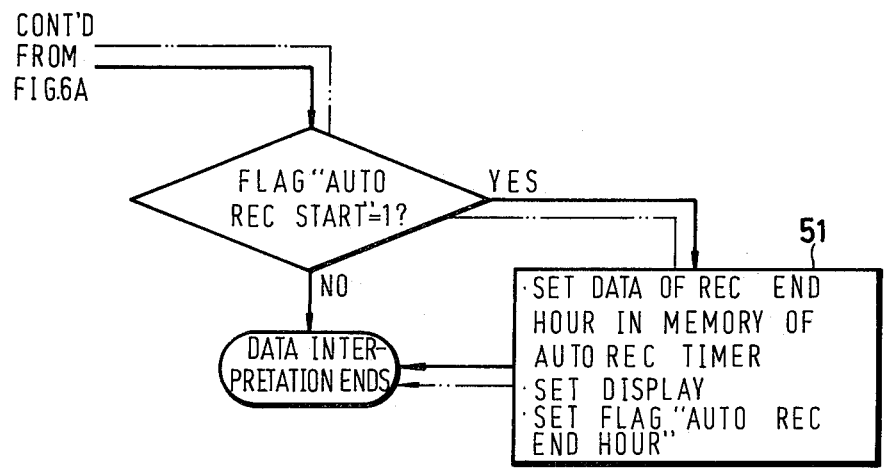

As shown in FIG. 6F, when the "auto record start" flag is "1", the data processing circuit 22 follows the operational steps of box 51. The data indicating the hour for the end of the auto record operation, as indicated by the final four digits of the code group 41, are written into an auto record time memory, an auto record end time is displayed, and an "auto record end hour" flag is set to "1".

Figure 6G:
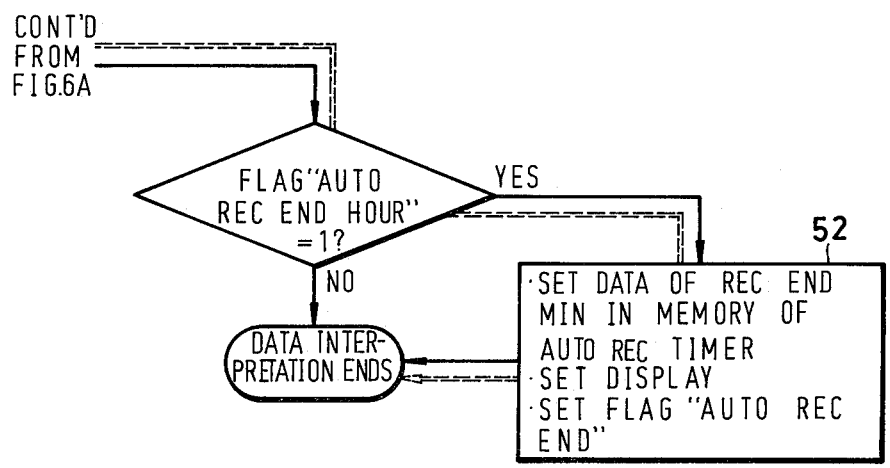

Finally, as illustrated in FIG. 6G, when the "auto record end hour" flag is "1", the minutes data derived from the final four digits of the code group 42 are stored in the auto record time memory, the end time minutes are displayed, and an "auto record end" flag is set to "1".

While in this example the selection cards 30-34 are scanned in consecutive order by the mark reader 10, it is possible to arrange the data processing circuit 22 so that after initially scanning a code group 36 of the card 30, the remaining code groups 37-42 of the cards 31-34 can be scanned in a desultory fashion, that is, in no particular order.

Further, while the various code groups 36-42 are here illustrated as printed on physically separate cards 30-34, it is to be understood that the term "card" as used herein could encompass a single sheet in which various areas thereon have the code groups 36-42 printed thereon. One example of this could be a pressure-sensitive label which could be adhered to one surface of the VTR 23 and which would have panels or sections thereof corresponding to the respective cards 30-35.

In addition, these code patterns could be printed in an instruction manual together with descriptive legends or brief sentences indicating the operations to be controlled thereby. The cards could also be formed as a portion of the exterior of the cabinet of the VTR 23.

A second embodiment of this invention is illustrated in FIG. 7. Here a sequence of selection and information cards are illustrated for use in controlling an FM radio receiver and an audio cassette recorder, in combination.

Initially, an illustrative or instructive card 60 has descriptive legends thereon indicating the simple steps for a user to follow to establish an automatic record operation.

A tape-type select card 61 is provided with code groups corresponding to respective bias conditions so that the tape recorder will be automatically set into the appropriate bias condition for the type of tape being used.

Next, a "Dolby" card, or noise-reduction select card 62 is provided to establish a noise-reduction mode in which pre-emphasis and/or compression is to be applied to the audio signal prior to recording, while on playback, a corresponding de-emphasis and/or expansion is to be applied to the audio signal.

Instructive cards 63–66 are used for setting the tape to a start postion thereof, adjusting the recording level, confirming the nature of the audio input and selecting either line or microphone, and switching the recording amplifier to the tuner of the receiver.

A mode select card 67 has an FM auto record code group thereon which is scanned by the mark reader 10 to establish an FM automatic recording mode. Then a day-of-week card 68 is scanned to select a desired day of week. On a channel select card 69 are printed channel select code groups provided with legends indicating the associated station call letters, and one of these code groups is scanned to select a desired FM channel.

A start-time select card 70 and an end-time select card 71 are used in a manner substantially the same as that of the corresponding cards 33 and 34 of the FIG. 4 embodiment.

Although in the described embodiments a monochrome bar pattern is used for the code groups, the code pattern could instead occur as a magnetic pattern, a concave-convex pattern, a pattern of punches in a tape, or as other equivalent symbols. Further, instead of the mark reader 10, a magnetic head, electromechanical sensor, or other appropriate reading means could be used.

It is also possible that the wires 17 of the mark reader 10 could be replaced with means for carrying electromagnetic waves, light, or ultrasonic waves to transmit the signal $V_C$ from the mark reader 10 to the sensor amplifier 20 and the data discrimination circuit 21.

Although specific embodiments of this invention have been described herein above with reference to the accompanying drawings, it is to be understood that this invention is not limited to those precise embodiments, and that various changes and modifications may be effected therein by one skilled in the art without departing from the scope or spirit of the invention as defined in the appended claims.

We claim:

1. Apparatus for controlling a receiver and recorder in combination, the receiver receiving broadcasts of high-fidelity music programs, said recorder being selectably settable into tape bias conditions corresponding to respective types of magnetic recording tape, the receiver and recorder in combination having a plurality of modes including a mode for automatically recording a received broadcast music program; comprising:
    a mode selection card bearing function code groups corresponding respectively to said modes;
    a channel selection card bearing channel code groups corresponding respectively to the broadcast music programs;
    a start-time select card bearing code groups corresponding to respective times of the day at which a program is to begin;
    an end-time select card bearing code groups corresponding respective times of the day at which a program is to end;
    a tape-select card bearing code groups corresponding to the respective tape bias conditions;
    a scanning instrument for manually scanning the code groups of the mode selection card, the channel selection card, the tape-select card, the start-time select card, and the end-time select card and producing electrical representations of the scanned code groups; and
    automatic code processing means for receiving said electrical representations and providing selecting signals in response thereto to said receiver and recorder in combination to select the mode thereof, to tune said receiver, to preset times for the recorder and receiver to be turned on and off, and to select the desired tape bias condition.

2. Apparatus according to claim 1, further comprising for selectively setting said recorder into a noise-reduction mode wherein pre-emphasis and/or compression is carried out on the audio signal prior to recording, and upon playback a corresponding de-emphasis and/or expansion is carried out, a noise-reduction select card bearing at least one code group corresponding to said noise-reduction mode, with said automatic code processing means selecting the noise-reduction mode in response to scanning of said associated code group by said scanning instrument.

* * * * *